US009166931B2

(12) United States Patent
Shi

(10) Patent No.: US 9,166,931 B2
(45) Date of Patent: Oct. 20, 2015

(54) METHOD AND DEVICE FOR IMPROVING ROBUSTNESS OF CONTEXT UPDATE MESSAGE IN ROBUST HEADER COMPRESSION

(75) Inventor: Xuehong Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 84 days.

(21) Appl. No.: 13/993,766

(22) PCT Filed: Aug. 19, 2011

(86) PCT No.: PCT/CN2011/078651
§ 371 (c)(1),
(2), (4) Date: Jun. 13, 2013

(87) PCT Pub. No.: WO2012/079381
PCT Pub. Date: Jun. 21, 2012

(65) Prior Publication Data
US 2013/0279516 A1    Oct. 24, 2013

(30) Foreign Application Priority Data

Dec. 17, 2010    (CN) .......................... 2010 1 0594645

(51) Int. Cl.
*H04L 12/66*    (2006.01)
*H04L 12/935*    (2013.01)
*H04L 29/06*    (2006.01)

(52) U.S. Cl.
CPC ............ *H04L 49/3009* (2013.01); *H04L 69/04* (2013.01); *H04L 69/22* (2013.01)

(58) Field of Classification Search
CPC ....... H04L 69/04; H04L 69/22; H04L 1/0026; H04L 69/16; H04L 69/161; H04W 28/06; H04W 80/04
USPC .......................... 370/328, 474, 229, 331, 477
See application file for complete search history.

(56) References Cited

U.S. PATENT DOCUMENTS

| 2004/0165527 A1* | 8/2004 | Gu et al. ........................ 370/229 |
| 2005/0265383 A1* | 12/2005 | Melpignano et al. ......... 370/465 |

(Continued)

FOREIGN PATENT DOCUMENTS

| CN | 1996941 A | 7/2007 |
| CN | 100433841 C | * 11/2008 |
| CN | 102036307 A | 4/2011 |

OTHER PUBLICATIONS

Liu, Tianzhao, Research on the algorithm for Robust Header Compression; Jan. 31, 2009 p. 3, 6, 7, 28-30, 40-43.

(Continued)

*Primary Examiner* — Dang Ton
*Assistant Examiner* — Sai Aung
(74) *Attorney, Agent, or Firm* — Ling Wu; Stephen Yang; Ling & Yang Intellectual Property

(57) ABSTRACT

A method and system for improving robustness of context update messages in robust header compression are disclosed in the present document, wherein, the method includes: when sending the context update message, a compressor performing check processing on important fields in the context update message, generating a check code, and sending the check code and the context update message out together; and after receiving the context update message and the check code of the important fields in the context update message, a decompressor firstly performing checking on the important fields in the context update message, if the checking is passed, continuing to execute decompression processing, and if the checking is failed, discarding the context update message. With the present document, the probability of mistaking other compression packets for IR/IR-DYN messages due to bit errors of packet format fields can be reduced, and the correctness of packet format identification can be improved.

10 Claims, 5 Drawing Sheets

(56) References Cited

U.S. PATENT DOCUMENTS

2006/0039358 A1* 2/2006 Kim ............................. 370/352
2007/0258458 A1* 11/2007 Kapoor ........................ 370/394
2008/0104648 A1   5/2008 Chae et al.
2009/0022107 A1* 1/2009 Kapoor et al. ................ 370/331
2010/0177693 A1* 7/2010 Ryu et al. ..................... 370/328
2010/0260098 A1* 10/2010 Ulupinar et al. .............. 370/315
2012/0113993 A1* 5/2012 Sridhar et al. ................ 370/474

OTHER PUBLICATIONS

International Search Report for PCT/CN2011/078651 dated Nov. 14, 2011.

* cited by examiner

METHOD AND DEVICE FOR IMPROVING ROBUSTNESS OF CONTEXT UPDATE MESSAGE IN ROBUST HEADER COMPRESSION

TECHNICAL FIELD

The present document relates to a robust header compression algorithm in the field of mobile communication, and particularly, to a method and device for improving robustness of context update message in robust header compression.

BACKGROUND OF THE RELATED ART

Due to limitations of physical condition, compared with a wired link, a wireless link in a mobile communication system has a lower transmission rate and a higher bit error rate. In order to be able to effectively utilize the limited wireless channel bandwidth resources, a Robust Header Compression (ROHC) technology is introduced. A core of ROHC is using information redundancy between packets of service streams to transparently compress and decompress information in a packet header between nodes connected directly. The ROHC technology is described in the document RFC3095 of the Internet Engineering Task Force (IETF), and the IETF made modifications on the ROHC technology in February, 2007, and the modified document is RFC4815.

A Context is an extremely important concept in the ROHC, which includes a compressed context and a decompressed context. A current state information set compressed by a compressor is called as the compressed context; and a current state information set decompressed by a decompressor is called as the decompressed context. The context contains relevant information of the previous one or more packet headers in the same packet stream, such as static fields and quoted reference values used during compressing and decompressing, and so on. In addition, the context also contains other information describing the packet stream, such as a changing way of an IPID field, a changing step size of a timestamp field, a current state and mode, and a clock precision and so on.

Initialization and Refreshment (IR) message is mainly used for establishing a new context or used for refreshing static information and dynamic information of the context (the dynamic information can be not contained). The compressor and decompressor can achieve the object of establishing the context and updating all information of the context by sending and receiving the IR messages and then increase robustness of the compression and decompression, which enables the subsequent compressed packets to be decompressed correctly.

Initialization and Refresh-Dynamic part (IR-DYN) message is mainly used for establishing or refreshing dynamic information of the context. The compressor and decompressor can achieve the object of establishing or synchronizing context dynamic information by sending and receiving the IR-DYN messages. A difference between the message and the IR message is that only the dynamic information is contained, and when the dynamic information of the context is damaged, the entire context can be repaired with the message, which enables the compressed packets received subsequently to be decompressed correctly.

In a case that a feedback channel exists, the decompressor in the ROHC can send an acknowledgement (ACK) and a Not acknowledgement (NACK) or a Static-Not acknowledgement (STATIC-NACK) to the compressor. The acknowledgement means that an acknowledgement message can be sent to the compressor after the decompressor decompresses the compressed packets successfully, which enables the compressor to perform state transition faster and improves the compression efficiency; and the Not acknowledgement means that the decompressor notifies the compressor to perform a context update, which improves the robustness of the entire algorithm of ROHC.

Currently, the ROHC supports the compression and decompression of data packets of the types of UNCOMPRESSED, IP/User Datagram Protocol (UDP)/Real-time Transport Protocol (RTP), IP/UDP and IP/Encapsulating Security Payload (ESP), and the corresponding Profile types are Profile0, Profile1, Profile2 and Profile3 respectively. There is only one context with regard to the Profile0, there is one or more contexts with regard to the other Profile types, and each context is identified through a Context Identifier (CID).

A context of the ROHC Profile0 type corresponds to all uncompressed data packets, and each context of the other Profile types corresponds to one packet stream. A packet stream is determined by all key fields (i.e. a STATIC-DEF field) in the packet stream. For example, with regard to an IPv4/UDP/RTP packet stream, it is jointly determined by a source address and a destination address of the part of IPv4, a source port number and a destination port number of the part of UDP, and a Synchronization Source Identifier (SSI) field of the part of RTP.

After receiving an original data packet, the compressor of ROHC is required to firstly judge a Profile type to which the packet belongs and then search for a context to which the packet belongs in a context linked list of the Profile type corresponding to the packet, if no context is found, it establishes a new context and adds the new context into the linked list. If a corresponding context is found, all fields in the current packet and corresponding fields in the context are compared and encoded, a type of the compressed packet required to be sent is decided, and the compressed packet is encapsulated according to an expected packet format and sent.

It can be seen from the above that the IR message and IR-DYN message play an important part in the whole process of compression and decompression. Since the ROHC itself is applied in the wireless link to improve the wireless link bandwidth utilization rate, but the bit error rate of the wireless link is comparatively high, bit errors may occur in the IR message and IR-DYN message during a transmission process of the wireless link, and a Cyclic Redundancy Check (CRC) of IR message and IR-DYN message with bit errors will be failed. If the CRC of the IR message is failed, a decompressing party needs to send the STATIC-NACK to a compressing party under a No Context (NC) state of Bidirectional Optimistic mode (O mode) or Bidirectional Reliable mode (R mode), it requests the compressing party to continue to send the IR messages, and performs refreshing on the static information and dynamic information of the context in time; if the CRC of the IR-DYN message is failed, the decompressing party sends the STATIC-NACK to the compressing party under the NC state of the O/R modes, it requests the compressing party to send the IR messages to refresh the static information and dynamic information of the context in time. If the CRC of an IR/IR-DYN packet is failed under other states of the decompressor, processing is performed according to a CRC failure flow ruled in the protocol, if K1 checks in the received N1 update packets are failed under a Full Context (FC) state, it is required to send the NACK to the compressing party, and if K2 checks in the received N2 update packets are failed under a Static Context (SC) state, it is required to send the STATIC- NACK to the compressing party, which is used to perform the request updating on corresponding dynamic and static contexts.

When feedbacks are sent, it is required to carry a Context Identifier (CID) in a feedback packet and notify the compressing party of a compressed context required to be updated. Since bit errors may occur in the IR/IR-DYN packet, a CID value parsed out by the decompressing party may well be incorrect, and if this CID is written into the feedback packet, it will be caused that a group of compressor and decompressor originally in efficient compression and decompression perform unnecessary updating, which reduces the compression efficiency and wastes the bandwidth of wireless link. Moreover, if the packet format is mistakenly coded by the wireless link, the following series processing is redundant, which wastes the system resources seriously.

SUMMARY OF THE INVENTION

The object of the present document is to provide a method and device for improving robustness of context update message in robust header compression, to solve the problem that a decompressing party cannot guarantee a correctness of the read packet type and cannot perform correct feedback to a compressing party in a case that the CRC of IR/IR-DYN messages is failed in the related art.

In order to solve the above technical problem, the present document provides a method for improving robustness of context update messages in robust header compression, which comprises:

when sending a context update message, a compressor performing check processing on important fields in the context update message, generating a check code, and sending the check code and the context update message out together; and after receiving the context update message and the check code of the important fields in the context update message, a decompressor firstly performing checking on the important fields in the context update message, if the checking is passed, continuing to execute decompression processing, and if the checking is failed, discarding the context update message.

In the method, the important fields comprise one or more of a packet type format field, a Context Identifier (CID) field and a profile type field.

In the method, in the step of sending the check code and the context update message out together, the compressor bears the check code by newly adding fields into the context update message and/or using existing fields in the context update message, so as to send the check code and the context update message out together.

In order to solve the above technical problem, the present document further provides a method for performing compression processing on context update messages in robust header compression, which comprises:

when sending a context update message, a compressor performing check processing on important fields in the context update message, generating a check code, and sending the check code and the context update message out together.

In the method, the important fields comprise one or more of a packet type format field, a Context Identifier (CID) field and a profile type field.

In the method, in the step of sending the check code and the context update message out together, the compressor bears the check code by newly adding fields into the context update message and/or using existing fields in the context update message, so as to send the check code and the context update message out together.

In order to solve the above technical problem, the present document further provides a method for performing decompression processing on context update messages in robust header compression, which comprises:

after receiving a context update message and a check code of important fields in the context update message, a decompressor firstly performing checking on the important fields in the context update message, if the checking is passed, continuing to execute decompression processing, and if the checking is failed, discarding the context update message.

In the method, the important fields comprise one or more of a packet type format field, a Context Identifier (CID) field and a profile type field.

In the method, the check code of the important fields in the context update message is borne in newly added fields in the context update message and/or in existing fields in the context update message;

the step of performing checking on the important fields in the context update message comprises: the decompressor obtaining the check code of the important fields in the context update message by decoding the newly added field and/or the existing fields; and executing check processing on the important fields in the context update message, obtaining a check code, comparing the check code obtained by the check processing and the check code of the important fields in the context update message obtained by decoding the newly added field and/or the existing fields, wherein, if they are consistent, the checking is passed, and if they are inconsistent, the checking is failed.

In order to solve the above technical problem, the present document further provides a system for improving robustness of context update messages in robust header compression, which comprises:

a compressor, configured to: when sending a context update message, perform check processing on important fields in the context update message, generate a check code, and send the check code and the context update message out together; and a decompressor, configured to: after receiving the context update message and the check code of the important fields in the context update message, firstly perform checking on the important fields in the context update message, if the checking is passed, continue to execute decompression processing, and if the checking is failed, discard the context update message.

In the system, the important fields comprise one or more of a packet type format field, a Context Identifier (CID) field and a profile type field.

In the system, the compressor is configured to send the check code and the context update message out together by the following way: bearing the check code by newly adding fields into the context update message and/or using existing fields in the context update message, so as to send the check code and the context update message out together.

In order to solve the above technical problem, the present document further provides a compressor, which is used for sending context update messages in robust header compression, wherein, the compressor comprises:

a check processing module, configured to: perform check processing on important fields in a context update message, and generate a check code; and a message sending module, configured to: send the context update message and the check code out together.

In the compressor, the important fields comprise one or more of a packet type format field, a Context Identifier (CID) field and a profile type field.

In the compressor, the message sending module is configured to send the context update message and the check code out together by the following way: bearing the check code by newly adding fields into the context update message and/or using existing fields in the context update message, so as to send the context update message and the check code out together.

In order to solve the above technical problem, the present document further provides a decompressor, which is used for decompressing context update messages in robust header compression, wherein, the decompressor comprises:

a checking module, configured to: after receiving a context update message and a check code of important fields in the context update message, perform checking on the important fields in the context update message; and a processing module, configured to: perform processing according to a check result, if the checking is passed, continue to execute decompression processing, and if the checking is failed, discard the context update message.

In the decompressor, the important fields comprise one or more of a packet type format field, a Context Identifier (CID) field and a profile type field.

In the decompressor, the check code of the important fields in the context update message is borne in newly added fields in the context update message and/or in existing fields in the context update message;

the checking module is configured to perform checking on the important fields in the context update message by the following way: obtaining the check code of the important fields in the context update message by decoding the newly added field and/or the existing fields; and executing check processing on the important fields in the context update message, obtaining a check code, comparing the check code obtained by the check processing and the check code of the important fields in the context update message obtained by the decoding, wherein, if they are consistent, the checking is passed, and if they are inconsistent, the checking is failed.

With the method and device for improving robustness of context update message in robust header compression provided by the present document, the problem that a decompressing party cannot guarantee a correctness of the read packet type and cannot perform a correct feedback to a compressing party in a case that CRC of IR/IR-DYN messages is failed in the related art can be overcome, which has the following advantages:

1. The decompressing party can learn whether a CID parsed out is correct and whether the CID can be carried in the feedback when there is a CRC error in IR/IR-DYN messages.

2. The probability of mistaking other compression packets for the IR/IR-DYN messages due to bit errors of packet format fields can be reduced, and the correctness of packet format identification is improved.

3. The case that the decompressing party sends a redundant Not acknowledgement due to the bit errors is reduced, and the compressing party is forced to transit from a high state to a low state.

4. The compression efficiency and wireless bandwidth utilization are enhanced.

PREFERRED EMBODIMENTS OF THE INVENTION

In order to make the object, technical scheme and advantages of the present document more clear, the examples of the present document will be described in detail in combination with the accompanying drawings. It should be noted that the examples in the present document and the characteristics in the examples can be optionally combined with each other in the condition of no conflict.

Figure 1:
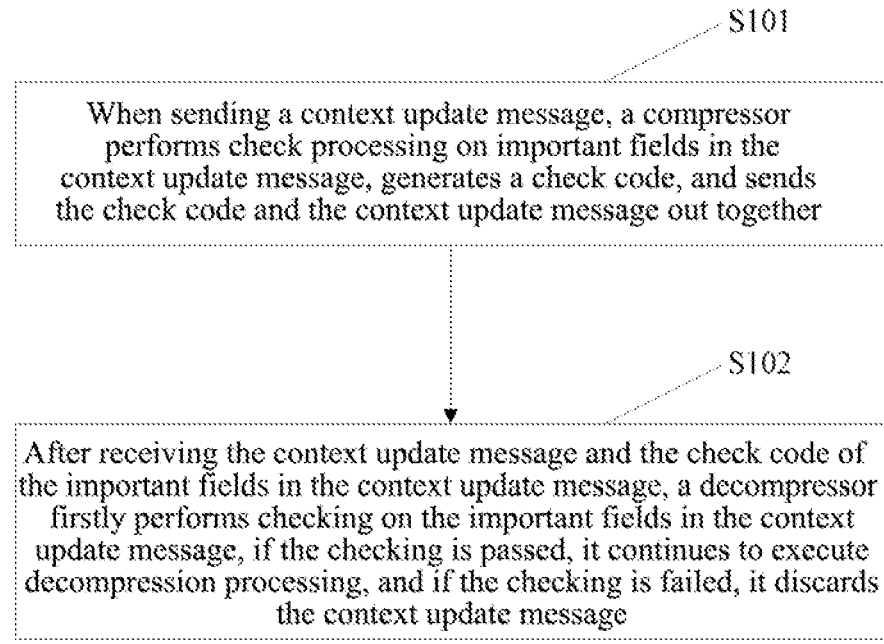
FIG. 1 is a flow diagram of a method for improving robustness of context update message according to the example of the present document.

With reference to FIG. 1, the FIG. 1 shows a method for improving robustness of context update message according to the example of the present document, and the method includes the following steps.

In step S101, when sending a context update message, a compressor also performs check processing on important fields in the context update message, generates a check code, and sends the check code and the context update message out together.

The context update message includes an IR message and an IR-DYN message.

In step S102, after receiving the context update message and the check code of the important fields in the context update message, a decompressor firstly performs checking on the important fields in the context update message, if the checking is passed, it continues to execute decompression processing, and if the checking is failed, it discards the context update message.

In the example of the present document, a check mechanism for important fields is subtly added to the context update message, whether a phenomenon of bit errors occurs in the important fields is preferentially checked, only after guaranteeing that the phenomenon of bit errors does not exist in the important fields, the subsequent decompression processing is executed, and if the phenomenon of bit errors exists in the important fields, the subsequent processing is not executed any more, and the message is discarded directly, thereby greatly reducing the waste of system resources and enhancing the processing efficiency.

In the method of the example, the important fields can include a Context Identifier (CID) field, by performing checking on the CID field, the case that the decompressor feeds back incorrect CIDs to the compressor due to bit errors of the CID field is avoided. The important fields also can include a packet type format field, by performing checking on the packet type format field, the case that other compression packets are mistaken for the IR message or IR-DYN message due to bit errors of the packet format field is avoided, which improves the correctness of the packet format identification. The important fields also can include a profile type field, the field is a must when a context is established, which is used for identifying which kind of profile the context belongs to, the profile implicitly defines a series of ways for compressing and decompressing the packet stream, and by performing checking on the profile type field, that context types are established incorrectly is avoided. Certainly, other fields which may have larger influence on the correctness of feedbacks of the decompressor due to incorrect identifications also can be included.

In the method of the example, the compressor can use various ways to perform check processing on the important fields, for example, they can be Cyclic Redundancy Check (CRC) processing, checking and processing, odd-even check processing, repetition code check processing and constant ratio code check processing and so on.

In the method of the example, the compressor can bear the check code into the message so as to send the check code and the message out together. In a specific implementation, the check code can be borne by newly adding fields into the message and/or using the existing fields in the message.

Figure 2:
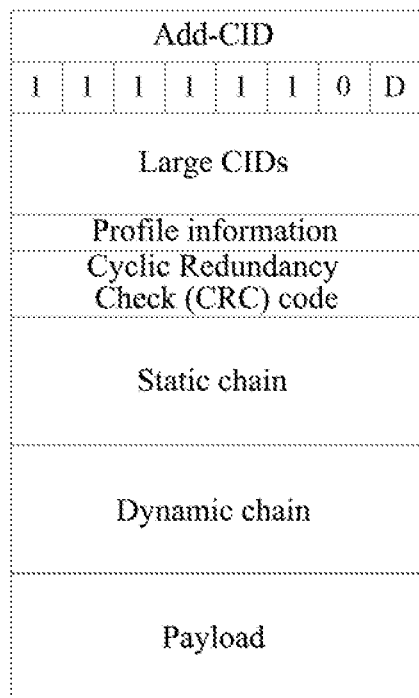
FIG. 2(a) is a schematic diagram of an IR message format defined by the protocol.
FIG. 2(b) is a schematic diagram of an IR-DYN message format defined by the protocol.
Figure 2:
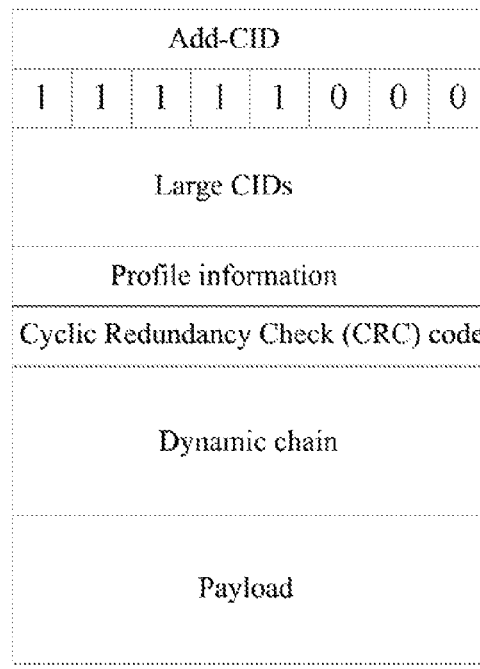
Figure 3:
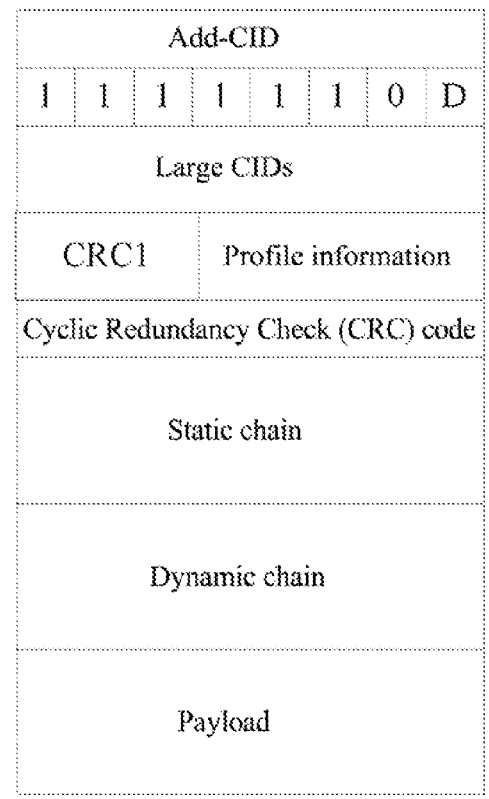
FIG. 3(a) is a schematic diagram of a new format of an IR message wherein CRC processing is added for important fields according to the example of the present document.
FIG. 3(b) is a schematic diagram of a new format of an IR-DYN message wherein CRC processing is added for important fields according to the example of the present document.
Figure 3:
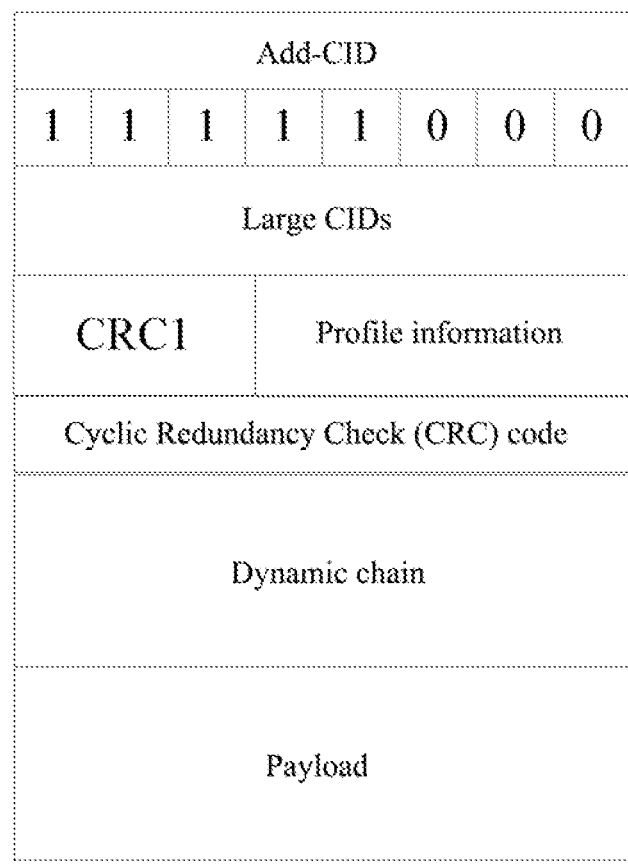
Figure 4:
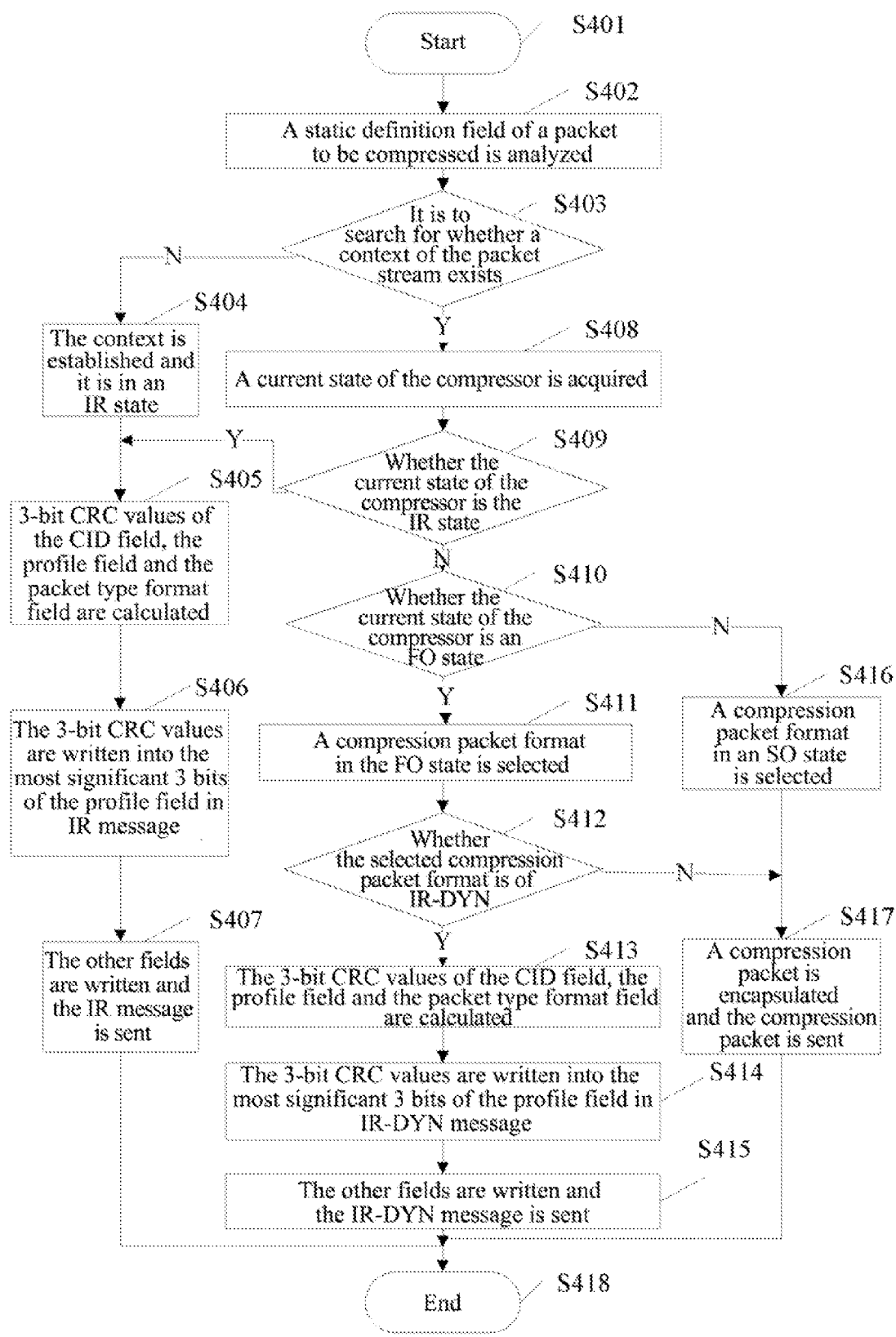
FIG. 4 is a flow diagram of a compressor generating IR/IR-DYN messages with new formats according to the application example of the present document.

With reference to FIG. 2(a) and FIG. 2(b), wherein, FIG. 2(a) shows an IR message format defined by the protocol, and FIG. 2(b) shows an IR-DYN format defined by the protocol. Wherein, a profile field in the IR/IR-DYN packet is of 8 bits, and the profile field defined by the RFC 3095 currently is only of 4 bits, that is, the rest 4 bits are idle bits. Therefore, in a specific implementation, CRC check processing can be used with respect to the important fields in the example of the present document, a 3-bit CRC check code is generated, and 3 idle bits in the profile field in the message are subtly used to bear the CRC check code, for example, in the most significant 3 bits of the profile field, a specific message format may refer to FIG. 3(a) and FIG. 3(b), wherein a CRC1 is a check code of the important fields in the context update message.

In order to implement the above method, the example of the present document also provides a compressor, a decompressor and a system.

The compressor provided by the example of the present document is used for sending the context update message in robust header compression, and the compressor includes:

a check processing module, configured to: perform check processing on important fields in the context update message, and generate a check code; and a message sending module, configured to: send the context update message and the check code out together.

In the compressor of the example, the important fields can include one or more of a packet type format field, a Context Identifier (CID) field and a profile type field. Moreover, other fields which may have larger influence on the correctness of feedbacks of the decompressor due to incorrect identifications also can be included.

Preferably, the message sending module can be further configured to: bear the check code by newly adding fields into the context update message and/or using the existing fields in the context update message, so as to send the check code and the context update message out together.

The decompressor provided by the example of the present document is used for decompressing the context update message in robust header compression, and the decompressor includes:

a checking module, configured to: after receiving the context update message and a check code of important fields in the context update message, perform checking on the important fields in the context update message; and a processing module, configured to: perform processing according to a check result, if the checking is passed, continue to execute decompression processing, and if the checking is failed, discard the context update message.

In the decompressor of the example, the important fields can include one or more of a packet type format field, a Context Identifier (CID) field and a profile type field. Moreover, other fields which may have larger influence on the correctness of feedbacks of the decompressor due to incorrect identifications also can be included.

Preferably, the check code of the important fields in the message can be borne in newly added fields in the message and/or in existing fields in the message. Correspondingly, the checking module can be configured to: obtain the check code of the important fields in the message by decoding the newly added field and/or the existing fields. The checking module can be configured to perform checking by the following way: executing check processing on the important fields in the message, obtaining a check code, comparing the check code obtained by the check processing and the check code of the important fields in the message obtained by the decoding, wherein, if they are consistent, the checking is passed, and if they are inconsistent, the checking is failed.

The system provided by the example of the present document includes a compressor and a decompressor, which can improve robustness of context update message in robust header compression. The system includes:

the compressor, configured to: when sending the context update message, also perform check processing on important fields in the context update message, generate a check code, and send the check code and the context update message out together;

the decompressor, configured to: after receiving the context update message and the check code of the important fields in the context update message, firstly perform checking on the important fields in the context update message, if the checking is passed, continue to execute decompression processing, and if the checking is failed, discard the context update message.

In the system of the example, the important fields can include one or more of a packet type format field, a Context Identifier (CID) field and a profile type field. Moreover, other fields which may have larger influence on the correctness of feedbacks of the decompressor due to incorrect identifications also can be included.

Preferably, the compressor can bear the check code by newly adding fields into the context update message and/or using existing fields in the context update message, so as to send the context update message and the check code out together.

In order to further describe the implementation scheme of the present document, a specific application example is used to make descriptions in the present document.

Application Example 1

In step S401, a compressor receives a packet to be compressed, and the flow enters step S402.

In step S402, the compressor analyzes a static definition field of the packet to be compressed, and the flow enters step S403.

In step S403, the compressor searches for whether a context of the packet stream exists, if the context does not exist, the flow enters step S404, and if the context exists, the flow enters step S408.

In step S404, the compressor establishes the context of the packet stream and it is in an IR state, and the flow enters step S405.

In step S405, the compressor calculates 3-bit CRC values of the CID field, the profile field and the packet type format field, and the flow enters step S406.

In step S406, the compressor writes the 3-bit CRC values into the most significant 3 bits of the profile field in IR message, and the flow enters step S407.

In step S407, the compressor writes the other fields and sends the IR message, and the flow enters step S418.

In step S408, the compressor acquires its current state, and the flow enters step S411.

In step S409, if the compressor determines that the current state is the IR state, the flow enters step S405, and if the compressor determines that the current state is not the IR state, the flow enters step S410.

In step S410, if the compressor determines that the current state is a First Order (FO) state, the flow enters step S411, and if the compressor determines that the current state is not the FO state, the flow enters step S416.

In step S411, the compressor selects a compression packet format in the FO state, and the flow enters step S412.

In step S412, the compressor judges whether the selected compression packet format is of IR-DYN, if yes, the flow enters step S413, and if not, the flow enters step S417.

In step S413, the compressor calculates the 3-bit CRC values of the CID field, the profile field and the packet type format field, and the flow enters step S414.

In step S414, the compressor writes the 3-bit CRC values into the most significant 3 bits of the profile field in the IR-DYN message, and the flow enters step S415.

In step S415, the compressor writes the other fields and sends the IR-DYN message, and the flow enters step S418.

In step S416, the compressor selects a compression packet format in a Second Order (SO) state, and the flow enters step S417.

In step S417, the compressor encapsulates a compression packet and sends the compression packet, and the flow enters step S418.

In step S418, the flow of the compressor generating the IR/IR-DYN messages with new formats ends.

Figure 5:
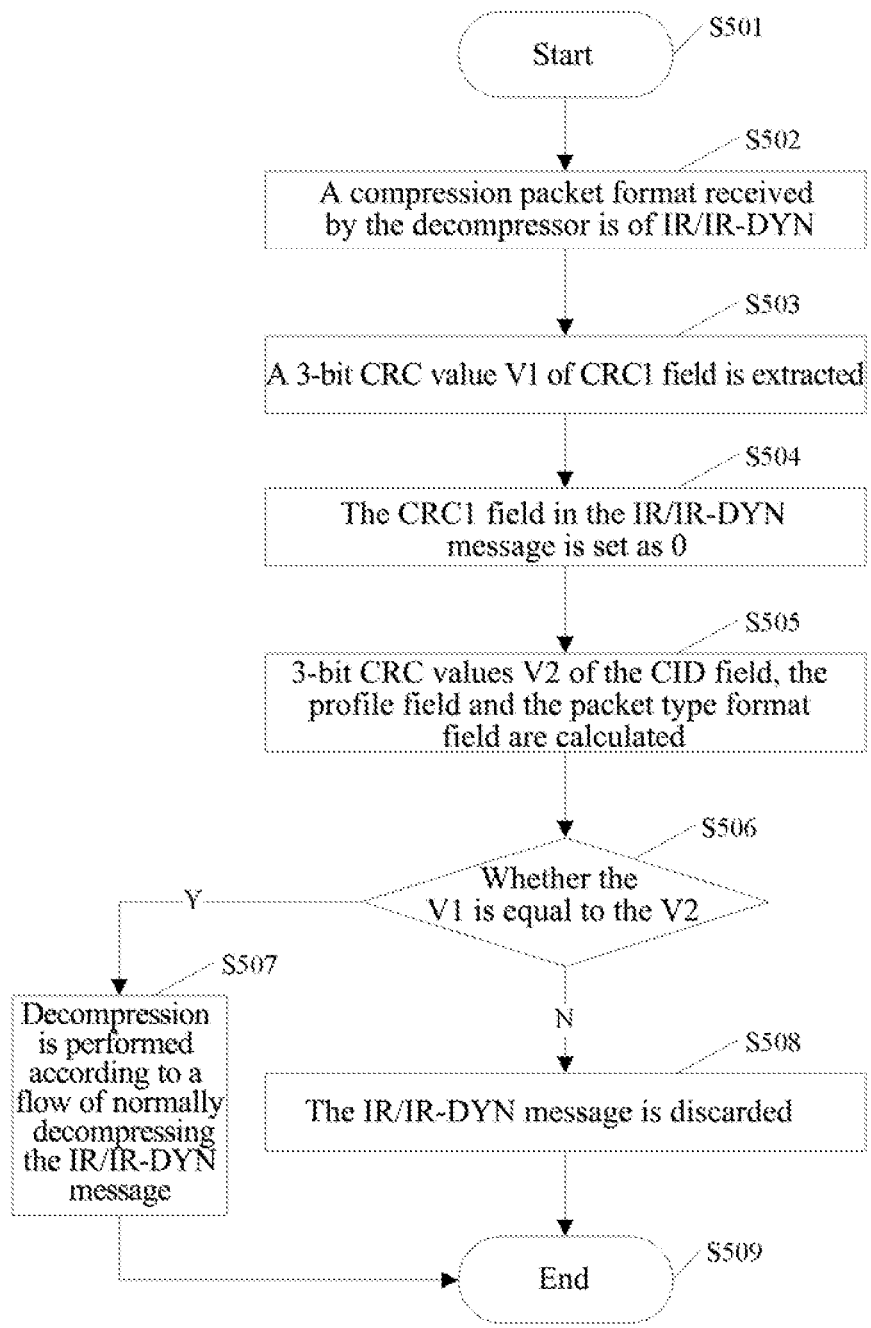
FIG. 5 is a flow diagram of a decompressor decompressing IR/IR-DYN messages with new formats according to the application example of the present document.

The implementation scheme of a decompressor decompressing IR/IR-DYN messages with new formats involved in the application example of the present document will be further described in detail in combination with the accompanying FIG. 5 below.

In step S501, a decompressor receives a compression packet, and the flow enters step S502.

In step S502, a compression packet format received by the decompressor is of IR/IR-DYN, and the flow enters step S503.

In step S503, the decompressor extracts a 3-bit CRC value V1 of CRC1 field, and the flow enters step S504.

The CRC1 field is the most significant 3 bits of a profile field in the IR message.

In step S504, the decompressor sets the CRC1 field in the IR/IR-DYN message as 0, and the flow enters step S505.

In step S505, the decompressor calculates 3-bit CRC values V2 of the CID field, the profile field and the packet type format field, and the flow enters step S506.

In step S506, the decompressor judges whether the V1 is equal to the V2, if yes, the flow enters step S507, and if not, the flow enters step S508.

In step S507, the decompressor performs decompression according to a flow of normally decompressing the IR/IR-DYN message, and the flow enters step S509.

In step S508, the decompressor discards the IR/IR-DYN message, and the flow enters step S509.

In step S509, the flow of the decompressor decompressing the IR/IR-DYN message with new formats ends.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or more integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In the preset document, the problem that the decompressing party cannot guarantee a correctness of the read packet type and cannot perform correct feedback to the compressing party in a case that the CRC of IR/IR-DYN messages is failed in the related art can be overcome, and the decompressing party can learn whether a CID parsed out is correct and whether the CID can be carried in the feedback when there is a CRC error in the IR/IR-DYN messages. With the present document, the probability of mistaking other compression packets for the IR/IR-DYN messages due to bit errors of packet format fields can be reduced, the correctness of packet format identification can be improved, the case that the decompressing party sends a redundant Not acknowledgement due to the bit errors can be reduced, the compressing party can be forced to transit from a high state to a low state, and the compression efficiency and wireless bandwidth utilization can be enhanced.

What is claimed is:

1. A method for performing compression processing on context update messages in robust header compression, comprising:

when sending a context update message, a compressor performing check processing on important fields in the context update message to generate a check code for the important fields, and sending out the generated check code of the important fields together with the context update message;

wherein the important fields comprise at least a Context Identifier (CID) field, or the CID and any one or both of a packet type format field and a profile type field, and the check code is used to check whether there is an error in the important fields;

wherein whether there is an error in the important fields is firstly checked by using the check code, only when there is no error in the important fields, a subsequent decompression processing is executed, and when there is an error in the important fields, the subsequent decompression processing is not executed any more, and the context update message is discarded directly;

wherein the check code of the important fields in the context update message is borne in a newly added field in the context update message and/or in an existing field in the context update message; and performing checking on the important fields in the context update message comprises:

obtaining the check code of the important fields in the context update message by decoding the newly added field and/or the existing field; and executing check processing on the important fields in the context update message to obtain a check code, comparing the check code obtained by the check processing and the check code of the important fields in the context update message obtained by decoding the newly added field and/or the existing field, if consistent, the checking being passed, and if inconsistent, the checking being failed.

2. The method according to claim 1, wherein:
in the step of sending out the check code together with the context update message, the compressor bears the check code by the newly added field into the context update message and/or using the existing field in the context update message, so as to send out the check code together with the context update message.

3. A method for performing decompression processing on context update messages in robust header compression, comprising:
after receiving a context update message and a check code of important fields in the context update message, a decompressor firstly performing checking on the important fields in the context update message by using the check code, if the checking is passed, continuing to execute decompression processing, and if the checking is failed, discarding the context update message without decompression processing;
wherein the important fields comprise at least a Context Identifier (CID) field, or the CID and any one or both of a packet type format field and a profile type field, and the check code is used to check whether there is an error in the important fields;
wherein the check code of the important fields in the context update message is borne in a newly added field in the context update message and/or in an existing field in the context update message; and
the step of performing checking on the important fields in the context update message comprises: the decompressor obtaining the check code of the important fields in the context update message by decoding the newly added field and/or the existing field; and executing check processing on the important fields in the context update message to obtain a check code, comparing the check code obtained by the check processing and the check code of the important fields in the context update message obtained by decoding the newly added field and/or the existing field, if consistent, the checking being passed, and if inconsistent, the checking being failed.

4. A compressor for sending context update messages in robust header compression, comprising a processor and a storage device, wherein the storage device storing following modules to be executed by the processor:
a check processing module, configured to: perform check processing on important fields in a context update message to generate a check code of the important fields; and
a message sending module, configured to: send out the context update message together with the check code;
wherein the important fields comprise at least a Context Identifier (CID) field, or the CID and any one or both of a packet type format field and a profile type field, and the check code is used to check whether there is an error in the important fields;
wherein whether there is an error in the important fields is firstly checked by using the check code, only when there is no error in the important fields, a subsequent decompression processing is executed, and when there is an error in the important fields, the subsequent decompression processing is not executed any more, and the context update message is discarded directly;
wherein the check code of the important fields in the context update message is borne in a newly added field in the context update message and/or in an existing field in the context update message; and
performing checking on the important fields in the context update message comprises: obtaining the check code of the important fields in the context update message by decoding the newly added field and/or the existing field; and executing check processing on the important fields in the context update message to obtain a check code, comparing the check code obtained by the check processing and the check code of the important fields in the context update message obtained by decoding the newly added field and/or the existing field, if consistent, the checking being passed, and if inconsistent, the checking being failed.

5. The compressor according to claim 4, wherein:
the message sending module is configured to send out the context update message together with the check code by a following way: bearing the check code by the newly added field into the context update message and/or using the existing field in the context update message, so as to send out the context update message together with the check code.

6. A decompressor for decompressing context update messages in robust header compression, comprising a processor and a storage device, wherein the storage device storing following modules to be executed by the processor:
a checking module, configured to: after receiving a context update message and a check code of important fields in the context update message, perform checking on the important fields in the context update message by using the check code; and
a processing module, configured to: perform processing according to a check result, if the checking is passed, continue to execute decompression processing, and if the checking is failed, discard the context update message without decompression processing;
wherein the important fields comprise at least a Context Identifier (CID) field, or the CID and any one or both of a packet type format field and a profile type field, and the check code is used to check whether there is an error in the important fields;
wherein the check code of the important fields in the context update message is borne in a newly added field in the context update message and/or in an existing field in the context update message; and
the checking module is configured to perform checking on the important fields in the context update message by a following way: obtaining the check code of the important fields in the context update message by decoding the newly added field and/or the existing field; and executing check processing on the important fields in the context update message to obtain a check code, comparing the check code obtained by the check processing and the check code of the important fields in the context update message obtained by the decoding, if consistent, the checking being passed, and if inconsistent, the checking being failed.

7. The method according to claim 2, wherein:
the compressor bears the check code by using the existing field in the context update message comprises using most significant bits of the profile field.

8. The method according to claim 3, wherein:
the check code of the important fields in the context update message is borne in the existing field in the context update message comprises using most significant bits of the profile field.

9. The compressor according to claim 5, wherein:
the message sending module is configured to send out the context update message together with the check code by using the existing field in the context update message comprises using most significant bits of the profile field.

10. The decompressor according to claim 6, wherein:
the check code of the important fields in the context update message is borne in the existing field in the context update message comprises using most significant bits of the profile field.

* * * * *